(12) United States Patent
Kwak

(10) Patent No.: US 8,672,511 B2
(45) Date of Patent: *Mar. 18, 2014

(54) CABLE HOLDING AND POSITIONING DEVICE WITH EASILY SEPARATED AND RECONNECTED INTERLOCKING COMPONENTS

(71) Applicant: Steven E. Kwak, Lombard, IL (US)

(72) Inventor: Steven E. Kwak, Lombard, IL (US)

(\*) Notice: Subject to any disclaimer, the term of this patent is extended or adjusted under 35 U.S.C. 154(b) by 0 days.

This patent is subject to a terminal disclaimer.

(21) Appl. No.: 13/680,186

(22) Filed: Nov. 19, 2012

(65) Prior Publication Data

US 2013/0075127 A1 Mar. 28, 2013

Related U.S. Application Data

(63) Continuation of application No. 12/833,240, filed on Jul. 9, 2010, now Pat. No. 8,313,217, which is a continuation of application No. PCT/US2009/030529, filed on Jan. 9, 2009.

(60) Provisional application No. 61/010,709, filed on Jan. 11, 2008.

(51) Int. Cl.
*F21V 33/00* (2006.01)

(52) U.S. Cl.
USPC ............ 362/253; 362/396; 362/457; 174/60; 174/91; 174/135

(58) Field of Classification Search
USPC ......... 174/74 R, 79, 91, 135, 136, 407 D, 60; 362/253, 396, 457
See application file for complete search history.

(56) References Cited

U.S. PATENT DOCUMENTS

| | | |
|---|---|---|
| 2,253,974 A | 8/1941 | Guild |
| 3,068,316 A | 12/1962 | Witt |
| 3,337,682 A | 8/1967 | Swett |
| 4,475,649 A | 10/1984 | Haarbosch |
| 4,979,614 A | 12/1990 | Ruhaut |
| 5,032,324 A | 7/1991 | Petrillo |
| 5,037,324 A | 8/1991 | Scheffey, Sr. |
| 5,619,569 A | 4/1997 | McVay |
| 6,034,328 A | 3/2000 | Kjerrumgaard |

(Continued)

FOREIGN PATENT DOCUMENTS

| | | |
|---|---|---|
| JP | 04-051026 A | 2/1992 |
| JP | 2005-006387 A | 1/2005 |
| JP | 2005-176491 A | 6/2005 |
| KR | 20-1998-42382 | 9/1998 |
| KR | 20-0262794 | 3/2002 |

OTHER PUBLICATIONS

International Preliminary Report on Patentability for Application No. PCT/US2009/030529, dated Jul. 13, 2010.

(Continued)

*Primary Examiner* — Stephen F Husar
(74) *Attorney, Agent, or Firm* — Marshall, Gerstein & Borun LLP; Michael P. Furmanek

(57) ABSTRACT

A device for releasably positioning a cable on a support surface comprises a first housing component and a second housing component. The first housing component is releasably engaged with the second housing component. At least one channel is defined between the first and second housing components for releasably receiving and positioning a cable, wherein the at least one channel has an inlet and an outlet that can have the same dimensions.

18 Claims, 8 Drawing Sheets

(56) References Cited

U.S. PATENT DOCUMENTS

| | | |
|---|---|---|
| 6,301,752 B1 | 10/2001 | Koppang |
| 6,425,165 B2 | 7/2002 | Koppang |
| D464,325 S | 10/2002 | Peters et al. |
| 6,740,817 B1 | 5/2004 | Anderson |
| 6,916,992 B1 | 7/2005 | Ortiz |
| 7,317,162 B2 * | 1/2008 | Kaady .............................. 174/91 |
| D628,461 S | 12/2010 | Stein, Jr. et al. |
| 8,039,750 B2 | 10/2011 | Magnusson |

OTHER PUBLICATIONS

International Search Report for Application No. PCT/US2009/030529, dated Aug. 24, 2009.
Office Action for U.S. Appl. No. 12/302,542 dated Nov. 25, 2011.

* cited by examiner

CABLE HOLDING AND POSITIONING DEVICE WITH EASILY SEPARATED AND RECONNECTED INTERLOCKING COMPONENTS

CROSS-REFERENCE TO RELATED APPLICATIONS

This is a continuation of U.S. patent application Ser. No. 12/833,240, filed Jul. 9, 2010 (now U.S. Pat. No. 8,313,217, issued Nov. 20, 2012), which is a continuation of International Patent Application No. PCT/US09/30529, with an international filing date of Jan. 9, 2009, and which claims the priority benefit of U.S. Provisional Patent Application No. 61/010,709, filed Jan. 11, 2008. The entire contents of each of the foregoing applications is hereby incorporated herein by reference.

FIELD OF THE INVENTION

The present invention pertains to a cable positioning, holding, and/or guiding structure with a latching quality. An article of manufacture, which consists of two components, e.g., sections, that when placed together create a "cable guiding structure and latching mechanism", intended to maintain the cable in an organized fashion in its preferred location. The device prevents cable misplacement, or entanglement, and keeps the cable in a location for convenient "presentation" prior to use.

The device is a weighted cable guiding and latching device that is useful for personal and business use in maintaining the positions of cables or cords affiliated with common personal electronic devices such as computers, MP3 players, CD Players, telephones, mobile telephones, laptop computers, personal digital assistants, and electronic personal gaming devices, etc.

BACKGROUND

Known devices for holding cables include mobile phone carriages, but these devices are primarily designed to store mobile phones for charging.

Similar known devices do not leverage the same method to secure a cable, are not intended to easily be opened or closed for quick access/release of the cable. Some existing patents disclose devices that are functionally designed to manage excess cord, or guide cord through a cylinder to keep it organized or hidden. Examples include: U.S. Pat. No. 6,301,752; U.S. Pat. No. 6,425,165; U.S. Pat. No. 6,916,992; and U.S. Pat. No. 6,740,817.

Existing devices have limitations which the present invention addresses:
Not Universal: Designed exclusively for specific cell phones, or other electronic devices;
Not designed for managing only the cord;
Designed primarily for device to rest on and plug into for charging or power delivery;
Typically, either have solid base which cord powers into, and phone sits in to charge; and
Not designed to remove cord with ease. Typically have to take entire base with when traveling or using in another location.

GENERAL DESCRIPTION

The present disclosure therefore provides a latching, weighted, fashionable "product" of manufacture, used to maintain a cable in its desired location such as on a desktop, dresser, table, or counter top, but theoretically on any supporting surface or in any desired location.

In one embodiment, a housing consisting of two components which magnetically or otherwise "latch/lock" together, with a channel running between them to form a cylinder which allows the cable to pass therethrough. The cable can slide through the cylinder, but is restricted at the exit point opening which is large enough to allow the cable to move, but small enough to prevent a device connector on the end of the cable from passing back through the cylinder exit point. The cable therefore stays in its resting space ready for use/connection to its intended device.

Plastic, wood, or another solid or rubber like material is used to create the product/cable housing the cylinder and is intended to be a desirable desktop, dresser, or countertop display item, or to reside in a desirable desktop, dresser, or countertop display item. It acts as a device to ensure a cable does not leave its intended placement, eliminating end user frustration when searching for misplaced cables, preventing cable entanglement with other cables or items, and providing a safe environment for cable delivery.

The disclosed device is intended to hold cables in place for household, personal, and business oriented electronic power, network data, or other common cables, e.g., for connecting/powering such devices as cell phones, laptop computers, electronic toys, MP3 players, Portable CD players, PDA's, personal electronic gaming toys, and other personal or business products.

Fashionable designs which make the housing for the cable guiding device are typically small in size so as to be placed on a desk, countertop, or dresser, and may resemble basic shapes such as a square, circular, or cube block, or be attached to another component to resemble desired personal items, such as sports items (footballs, baseballs), doll animals (dog, frog, bear), career items (doctors bag, nurses hat, fire truck, ambulance), or religious item (Cross, Star). Really anything someone might want to display. The device could also be attached or built into other non-fashionable items like a dresser, picture frame, desktop, or other solid object.

In one embodiment, the device includes a housing, which may also be referred to as a latching device, made of at least two components, with a channel defining a cylinder carved at the point where these two components connect. The cylinder runs the length of the pieces when placed together, creating openings at two sides of the device, providing a pass-through cylinder with a "securing" quality due to its small size at the opening exit point for a cable to slide through. The "two or more" components are secured together to create the cylinder, and can easily be separated to remove the cable.

The "two or more" components of material are designed to allow a cable with a "device" connector (of typical market size for electrical, networking, and other household and business cable items) to pass-through the opening, yet obstruct the connector end from falling back into and through the opening, thereby eliminating the possibility that the cable end will retreat back into the cylinder. This allows the charged device, e.g., cell phone, MP3 player, etc., or networking component to reside at an intended distance to the device once the charged device or networking component is attached to the cable connector. It also allows the cable connector to be placed back near the output point of the device without falling into the cylinder, thereby ensuring it rests in a known place for the next use.

The cylinder defined in the housing may vary in length, width, and shape (a straight pass-through, or possessing one or more bends along the way) depending on the cable and connector it intends to deliver, the device which it is intended to pass through, and the intended locations within the device of input and output points for placement and delivery of the cable.

When a cable is not attached to its intended charged device, and is desired to be taken out of the storage device, it can be removed from the cylinder by separating the two or more components attached by magnets, hinge, or other adhesive components and removing the cable. The storage device can then easily be placed back together.

The idea is to deliver a fashionable 'paperweight' like device to hold a cable securely wherever it is desired to rest. The two components magnetically or otherwise, e.g., with Velcro, etc., engage with and/or adhere to each other, but can be easily separated with minimal force to insert or remove the cable, then be placed back together again.

In one form, the device is weighted enough, or attached/secured to a device with enough weight to prevent the weight of the cable from pulling the device away from its intended placement.

A fashionable device can be a basic weighted block, ball, or cube, for example, or can be attached to another fashionable product such as a doll, picture frame, speaker, or computer monitor, etc. Alternatively, the device can be built into a shelf, a piece of furniture, or other larger stationary item.

In further embodiments, the device may be lighted, may have a sensor which lights when sensing darkness or movement, may be a clock or other electronic device as well.

DETAILED DESCRIPTION

Figure 1:
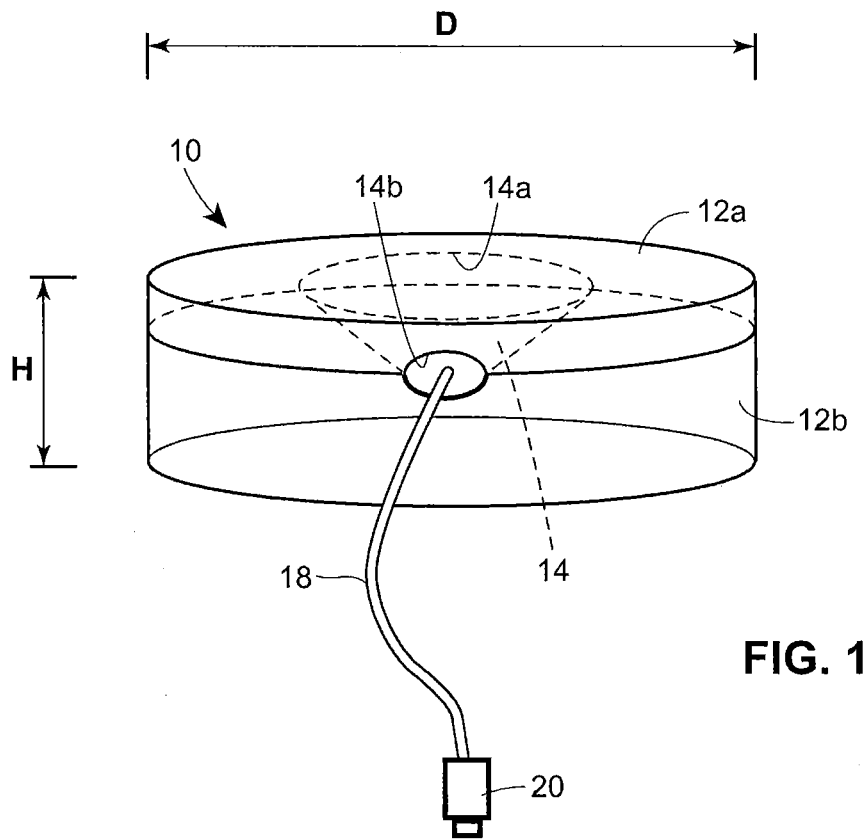
FIG. 1 is a front perspective view of a first embodiment of a cable positioning device constructed in accordance with the present disclosure.

The present invention relates to cable positioning device, which may also be referred to as a latching holder. More particularly, the present invention relates to a device for keeping a charger cable, network cable, or similar item residing in its intended position for use, or until it is intended to be used.

Generally, power cables are used for delivering electricity to 'charge' or 'power' miscellaneous household and business related devices, networking cables to deliver network data, or sound related cables typically are strewn across desks, dressers, countertops, etc. Due to gravity, and limited weight on the ends of the cable that connects into a device, the cable, when disconnected from the device tends to slide away from the place it is left and can become entangled with other cables, or completely slide off of the desk, countertop, or dresser and onto the floor. Cables that become displaced from their intended position become a frustration to end users.

Accordingly, it is the present invention provides a fashionable device which securely holds a cable, keeping it organized, in some cases hiding it from view while not in use, securing it, and keeping it at its intended position.

Such a device allows cables of common devices, such as cell phones, laptop computers, electronic toys, MP3 players, Portable CD players, PDA's, and other personal or business products to be secured in their intended position. A channel defining a cylinder for accommodating a cable is designed and intended to be placed in any form of device which could act as a fashionable "weighted device" to keep the cable in place. The device could be designed as an item that would be desired by end user to display on their desk, dresser, or countertop, but could also be a basic block or other common geometric shape and reside within an article of furniture or other product. Such a device could be manufactured of any solid or malleable material.

The device is designed to function with a vast majority of common household and office devices. The entry point of the cylinder, which receives the cable, can be substantially larger than the diameter of the intended cable, and the exit point of the cylinder can be only slightly larger than the diameter of the intended cable. The entry and exit points can be oval, circular, or any other shape to allow flexibility and play, specifically, at the entrance point of the cylinder. Conventional power cord cables for personal electronics or data cables, for example, can be ¼ inch or more, but the scale of the disclosed cable positioning device can be enlarged to accommodate larger cables.

The size of the cylinder depends on the following factors:
Width: Cable connector diameter, cable diameter; and
Length: The amount of pass-through length required for the cylinder to extend from the entry point to the exit point of the positioning device.

The cylinder described is mechanically built into the shape of the enclosing two or more components. These components can be held together magnetically or with Velcro or some other material, hinge, or clasp designed to allow intentional ease of separation and reconnection. This mechanism can be placed inside of another fashionable or structural product as an option, or stand alone as a fashionable product of its own. The finished product appears to have two holes in it, one for the cable to enter the enclosed cylinder, i.e., the entry point, and one for the exit point of the cable, i.e., the exit point. Further details of various embodiments of the present disclosure will be described below with specific reference to the accompanying drawings.

Figure 2:
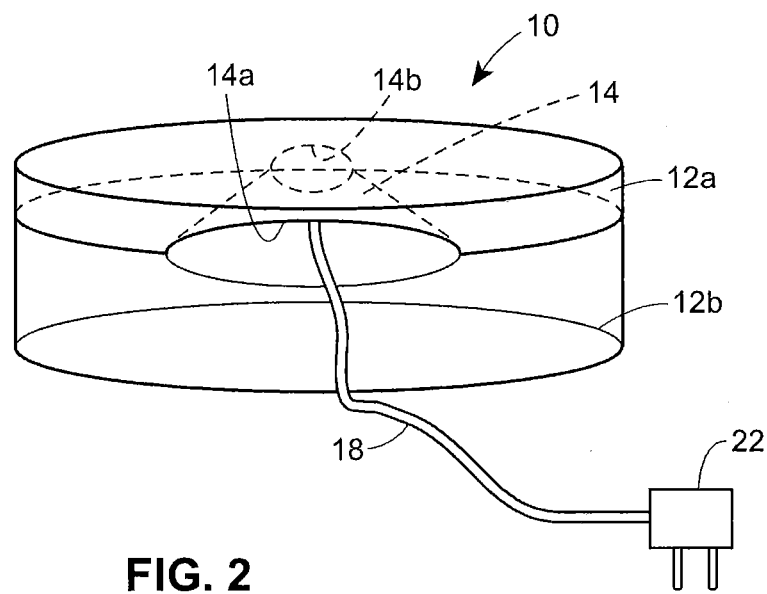
FIG. 2 is a rear perspective view of the cable positioning device of FIG. 2.

FIGS. 1 and 2 depict front and rear perspective views, respectively, of a first embodiment of a cable positioning device 10 constructed in accordance with the present disclosure. The depicted embodiment can be referred to as having a cylinder or "Circular Block" shape, which is similar to the shape of a hockey puck, for example. In a preferred embodiment, the "Circular Block" can have a diameter D in the range of approximately 1.5" to approximately 3" or larger, and can have a height H in the range of approximately ¾" to approximately 1" or larger. Other dimensions of course are intended to be within the scope of the present disclosure. The device 10 is constructed of upper and lower housing components 12a and 12b removably engaging one another. The housing components 12a, 12b can be constructed of plastic, metal, wood, marble, granite, ceramic, stone, concrete, or any other material which can be adapted to engage, couple, magnetically attract, or otherwise latch, engage, or be coupled together. When engaged, as depicted in FIGS. 1 and 2, the two components 12a, 12b define a channel 14 extending between an inlet point 14a (FIG. 2) and an outlet point 14b (FIG. 1). In the depicted embodiment, the outlet point 14b is a generally circular opening having a diameter of approximately ¼", while the inlet point 14a is a generally oval or eccentric shape having a minor axis dimension of approximately ¼" and a major axis dimension substantially greater than ¼", as shown in FIG. 2, for example. In one embodiment, the major axis dimension of the inlet point 14a can be approximately ½" or larger, for example. While the present embodiment includes an inlet point 14a having dimensions greater than the outlet point 14b, alternative embodiments can have the opposite arrangement, or can have the inlet and outlet points 14a, 14b having substantially the same dimensions.

Nevertheless, with the inlet and outlet points 14a, 14b configured as illustrated, the channel 14 occupies a generally convergent shape. That is, the channel 14 converges in dimension from the inlet point 14a to the outlet point 14b. This convergent shape is defined not only by the inlet and outlet points 14a, 14b, but can also be defined by contoured surfaces 16a and 16b (shown in FIG. 3) formed in the upper and lower housing components 12a, 12b, respectively. In the illustrated embodiment, the contoured surfaces 16a, 16b converge generally uniformly from the inlet point 14a to the outlet point 14b. In one embodiment, the contoured surfaces 16a, 16b could including a coating (not shown) of a material such as rubber or silicon for generating friction between the device and the cable and assisting in cable retention.

With the channel 14 configured as such, a cable 18 enters the channel 14 via the inlet point 14a and exits the outlet point 14b, as illustrated in FIGS. 1 and 2. The cable 18 includes a first end with a connector 20 adapted to be connected to its intended device to be charged, and a second end with a power plug 22, for example, adapted to be plugged into a conventional AC power outlet, or a USB port of a computer, for example. The connector 20 preferably has a dimension greater than the dimension of the outlet point 14b of the channel 14 such that the connector 20 cannot pass back into the channel 14 and out of the device 10, thereby always securing the position of the cable 18 and connector 20 for later use and alleviating user frustration.

Figure 3:
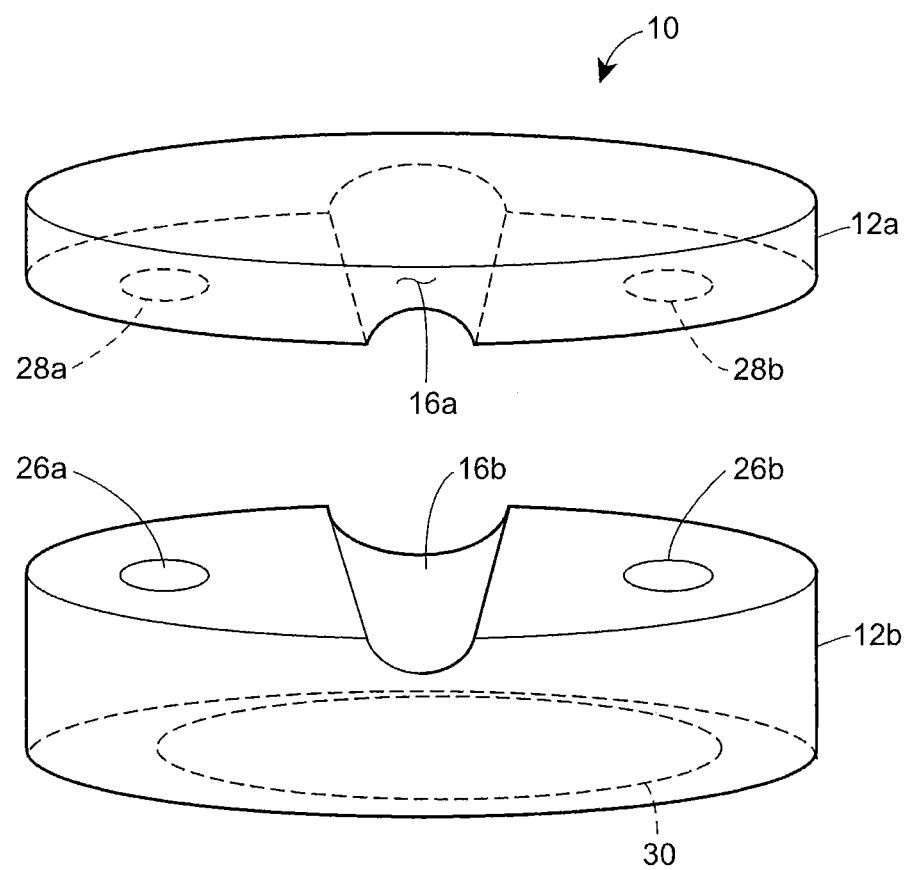
FIG. 3 is a partially exploded front perspective view of the cable positioning device of FIGS. 1 and 2.

To position and remove the cable 18 from the device 10, a user can separate the upper and lower housing components 12a, 12b, as shown in FIG. 3. Once separated, a user simply lays the cable 18 across the contoured surface 16b in the lower housing component 12b and repositions the upper housing component 12a thereon. The shape of the contoured surfaces 16a, 16b in the housing components 12a, 12b assist the user in positioning the cable 18 in the channel 14. That is, the larger dimension of the inlet point 14a of the channel 14 reduces how precisely a user must align the cable 18 with the contoured surface 16b in the lower housing component 12b.

Another advantage of the disclosed design is that once the cable 18 is positioned in the channel 14 and the housing components 12a, 12b are re-engaged with each other, the larger dimensioned inlet point 14a provides a certain amount of space for the cable 18 to move laterally. This can be beneficial in situations where the power plug 22 of the cable 18 is to be plugged into a power socket that is not located directly behind the device 10. In this situation, the cable 18 is allowed to slightly bend within the channel 14 to direct the plug 22 toward the misaligned socket. Allowing the cable 18 to bend within the channel 14 can help reduce the amount of force the bent cable 18 applies to the contoured surfaces 16a, 16b. This is beneficial because too great of forces can cause the device 10 to rotate or otherwise move along the surface, upon which the device 10 is positioned. Accordingly, it should be appreciated that the disclosed device 10 advantageously provides a cable positioning device that maintains its desired position, as well as the desired position of the cable 18, thereby alleviating the frustrations involved with searching for lost cables.

As mentioned, the housing components 12a, 12b depicted in FIGS. 1-3 are removably engageable to facilitate the placement of the cable 18. In one embodiment, the upper housing component 12a can include a coupling device such as a pair of magnets 28a, 28b. In the event that the lower housing component 12b is constructed of metal, the magnets 28a, 28b serve to secure the upper and lower housing components 12a, 12b in engagement with each other as depicted in FIGS. 1 and 2. In the event the lower housing component 12b is constructed of a material not attracted to magnets, it may include a pair of metal inserts 26a, 26b for being attracted to the magnets 28a, 28b. Additionally, the metal inserts 26a, 26b can assist the user in ensuring that the upper and lower housing components 12a, 12b are properly aligned when re-engaged to contain the cable 18. In one embodiment, the magnets 228a, 28b can have sufficient attraction to secure lightweight metal articles, such as paperclips, to the outside of the upper housing component 12a. Also, as depicted in FIG. 3, one embodiment of the device 10 can be equipped with a weight 30. The weight 30 can include a metal weight or any other material weight serving to maintain the position of the device 10 on its storage surface.

Figure 4:
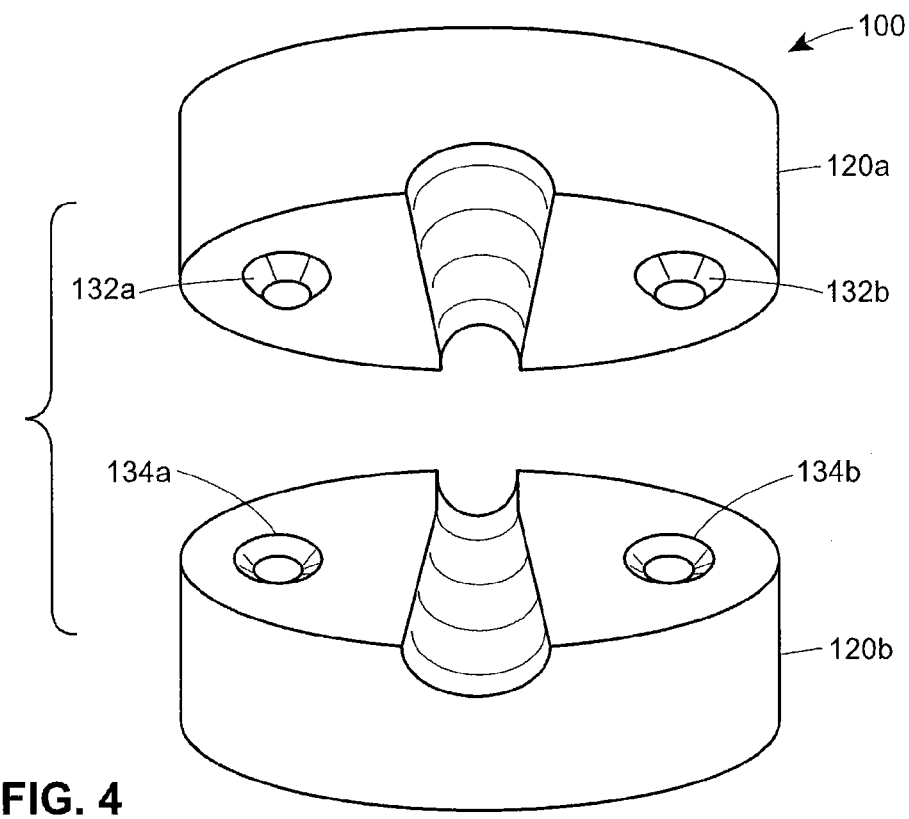
FIG. 4 is a partially exploded front perspective view of a second embodiment of a cable positioning device constructed in accordance with the present disclosure.

While the cable positioning device 10 discussed with reference to FIG. 3 can include magnets to secure the upper and lower housing components 12a, 12b together, other embodiments can be equipped with different faculties for performing this function. For example, FIG. 4 depicts an alternative embodiment of a cable positioning device 100 including upper and lower housing components 120a, 120b. The upper and lower housing components 120a, 120b are substantially identical to those described above with reference to FIGS. 1-3 except that the upper housing component 120a includes a pair of protrusions 132a, 132b and the lower housing component 120b includes a pair of recesses 134a, 134b. The protrusions 132a, 132b are adapted to be disposed in the recesses 134a, 134b when the components 120a, 120b are coupled together, as illustrated in FIGS. 1 and 2, for example. With the protrusions 132a, 132b disposed within the recesses 134a, 134b, the relative positions of the upper and lower housing components 120a, 120b are advantageously maintained. In the disclosed embodiment, the protrusions 132a, 132b and recesses 134a, 134b are slightly tapered to facilitate the alignment thereof. In addition to the protrusions 132a, 132b and the recesses 134a, 134b, it is foreseeable that either the upper or lower housing components 120a, 120b could also be equipped with magnets similar to the embodiment described above with reference to FIG. 3 to draw the housing components 120a, 120b together.

Figure 5:
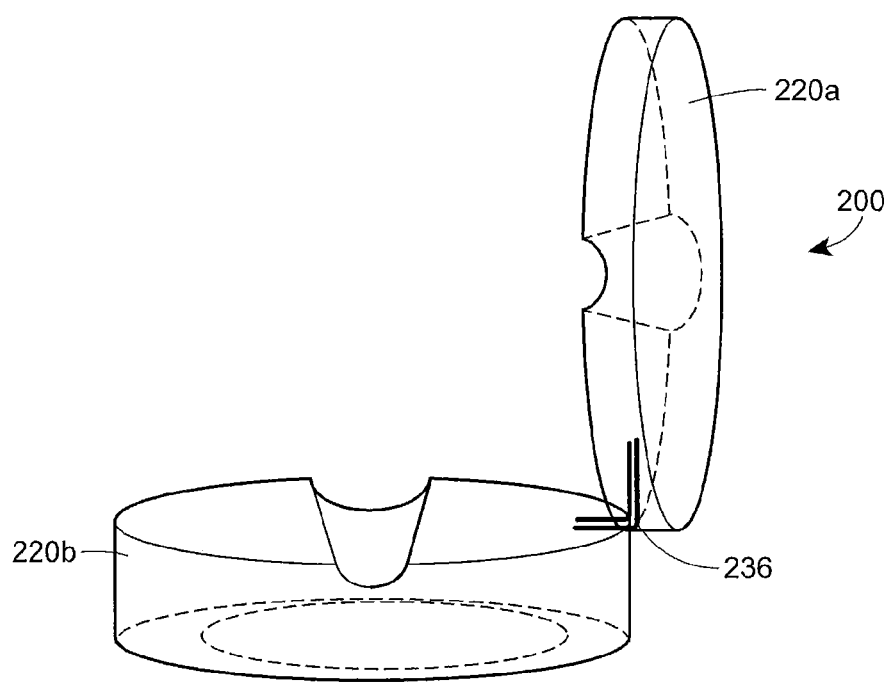
FIG. 5 is a front perspective view of a third embodiment of a cable positioning device constructed in accordance with the present disclosure.

FIG. 5 depicts yet another embodiment of a cable positioning device 200 constructed in accordance with the present disclosure. The cable positioning device 200 is substantially identical to those described above in that it includes upper and lower housing components 220a, 220b. Additionally, however, the cable positioning device depicted in FIG. 5 includes a hinge 236 pivotally coupling the housing components 220a, 220b together. As depicted, the hinge 236 enables the upper housing component 220a to pivot upward and out of engagement with the lower housing component 220b. In this position, a user can easily position a cable into the device 200 and move the upper housing component 220a back into engagement with the lower housing component 220b. In addition to the hinge 236, the device 200 could also be equipped with magnets and/or protrusion/recesses, as described above with prior embodiments. The hinge 236 can be generally any kind of hinge and could even include a spring biased hinge biasing the upper and lower housing components 220a, 220b into engagement with each other.

While the upper and lower housing components of the foregoing devices 10, 100, 200 have been disclosed as being connected through the use of magnets, protrusions/recesses, and/or a hinge, in alternative embodiments, the weight of the housing components themselves, and particularly, the upper housing component can be enough to maintain the relative position of the housing components as well as the position of the device on its support surface. In still further embodiments, it is foreseeable that the upper and lower housing components can be connected together with a snap-fit or a groove-lock type mechanism. To create a snap fit, one of the upper and lower housing components can have a male connector that fits into a female opening in the other housing component, as is generally understood. Under the application of force, the male connector may "snap" into the female opening to secure the components together. A groove lock type mechanism similarly could include male and female connectors, but instead of applying a force to "snap" the components together, the housing components may be rotated or slid relative to one another to effectuate the lock. Other types of connecting the housing components, not described herein, are intended to be within the scope of the present disclosure.

Figure 6:
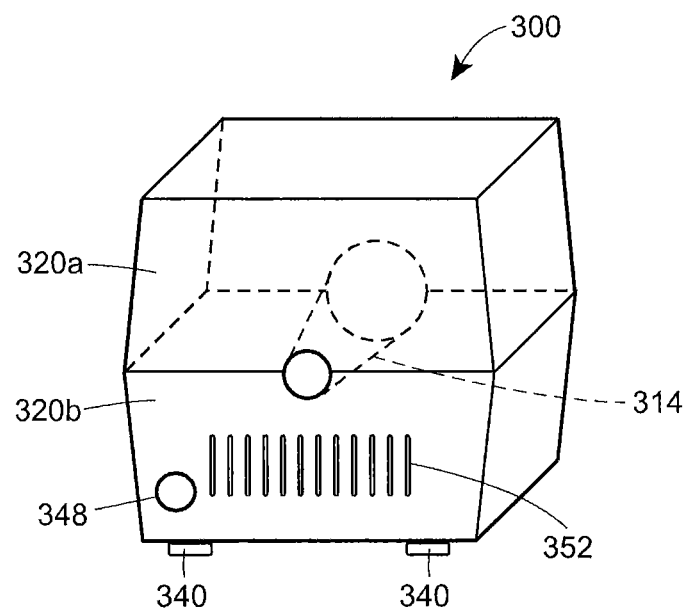
FIG. 6 is a front perspective view of a fourth embodiment of a cable positioning device constructed in accordance with the present disclosure.
Figure 7:
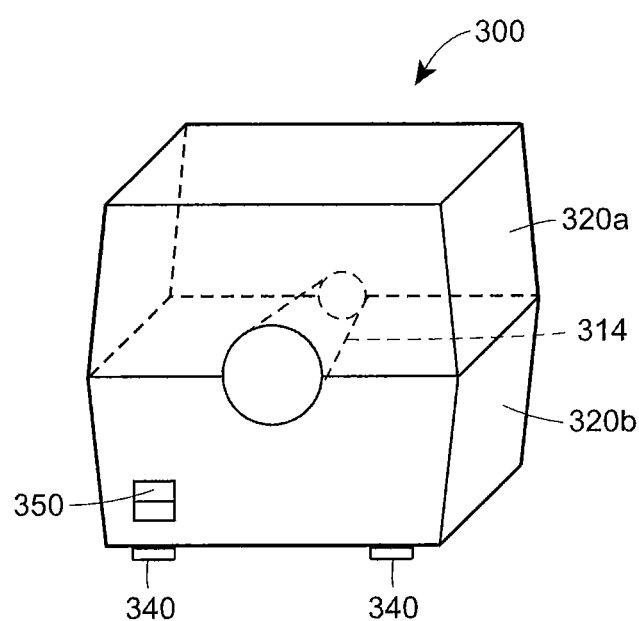
FIG. 7 is a rear perspective view of the cable positioning device of FIG. 6.

Referring now to FIGS. 6 and 7, another embodiment of a cable positioning device 300 constructed in accordance with the present disclosure includes a fashionable, illuminated device. Similar to the previously described devices, the device 300 in FIGS. 6 and 7 includes upper and lower housing components 320a, 320b defining a channel 314 for accommodating a cable (not shown). The channel 314 can be identical, in structure and functionality, to the channels described above.

As illustrated, however, the upper and lower housing components 320a, 320b are designed to define a generally box-shaped, or cube-shaped device 300. The lower housing component 320b is also equipped with a plurality of feet 340 for supporting the device 300 on a support surface. The feet 340 may be constructed of rubber or some other material. Rubber feet 340 can assist in creating friction between the device 300 and its support surface to help retain the desired position of the device 300.

In one embodiment, the upper and/or lower housing components 320a, 320b can be hollow to accommodate one or more components. For example, in the present embodiment, the lower housing component 320b, as shown in FIG. 9, can accommodate one or more light sources 342, electrical circuitry 344, one or more power sources 346, one or more sensors 348 (also shown in FIGS. 6 and 8), and a switch 350 (also shown in FIG. 7). In one embodiment, the lower housing component 320b can also be equipped with a plurality of slits 352 (shown in FIGS. 6 and 8) or openings of generally any other shape for enabling light generated by the one or more light sources 342 to be emitted from the device 300. In other embodiments, the upper and/or lower housing components 320a, 320b can be constructed of a transparent, translucent, or other material that allows light to pass therethrough. The emission of light from the device can both assist users in locating the device in a dark or dimly lit environment, for example, as well as provide a degree of aesthetic appeal. Of course, lights of different colors could be used.

In one embodiment, the one or more light sources 342 can include one or more light emitting diodes, or any other light emitting device. The one or more power sources 346 can include one or more conventional disposable or rechargeable batteries such as two size AA batteries removably disposed in a conventional battery socket. The power source 346 could alternatively include any different type of battery, as well as a conventional AC power cord or USB connector attached to the device 300 with a cord. The switch 350 can include a conventional switch wired between the power source 346 and the light source 342. As such, the one or more light sources 342 can be selectively powered by the one or more power sources 346, according to the operation of the switch 350. Additionally, as mentioned, the device 300 depicted in FIGS. 6-9 can be equipped with one or more sensors 348. The one or more sensors 348 can include a motion sensor, a heat sensor, a light sensor, or generally any other type of sensor wired between the power source 346 and the light source 342 for selectively powering the light source 342. For example, if the sensor 348 includes a motion sensor, the device 300 could become illuminated upon the detection of movement within a prescribed distance of the device. Therefore, if an individual enters a dark office, for example, the sensor 348 could detect the movement, illuminate the light source 342, and the individual could easily locate the device 300 and any cable stored thereby. If the sensor 348 includes a heat sensor, the device 300 could similarly power the light source 342 without direct individual interaction. If the sensor 348 includes a light sensor, the light sensor could be adapted to power the light source 342 whenever the level of light in the environment falls below a predetermined threshold. Therefore, it should be appreciated that the device 300 provides the added advantage of alerting users of its position for easy location. The switch 350 could be used to activate the sensor 348 and/or to directly activate the light source 342.

Figure 8:
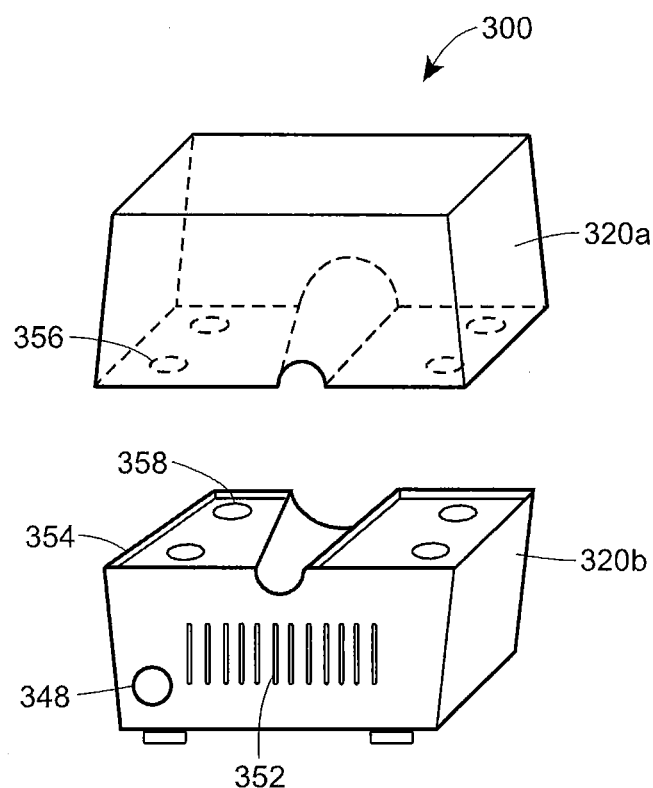
FIG. 8 is a partially exploded front perspective view of the cable positioning device of FIGS. 6 and 7.
Figure 9:
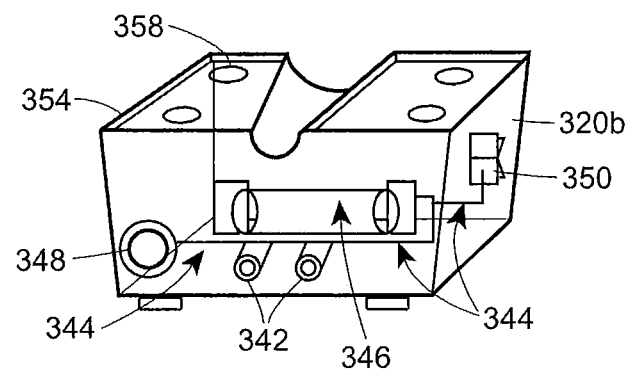
FIG. 9 is a front detail view of one housing component of the cable positioning device of FIGS. 6-8.

Still referring to FIG. 8, the device 300 functions generally identically to the devices 10, 100, 200 described above with respect to positioning cables. Additionally, to assist in aligning the upper and lower housing components 320a, 320b together, the lower housing component 320b can include a ridge 354 about its perimeter and the upper housing component 320c can include a corresponding recess (not shown). The ridge could alternatively be positioned on the upper housing component 320a and the recess on the lower housing component 320b. Regardless, the ridge 354 is adapted to be removably received in the recess to align the upper and lower housing components 320a, 320b to ensure that the channel 314 effectively retains the cable therein during use. Furthermore, to secure the upper and lower housing components 320a, 320b together, the upper housing component 320a can include a plurality of magnets 356 and the lower housing component 320b can include a corresponding plurality of metal inserts 358 for attracting the magnets, as shown in FIGS. 8 and 9.

Figure 13:
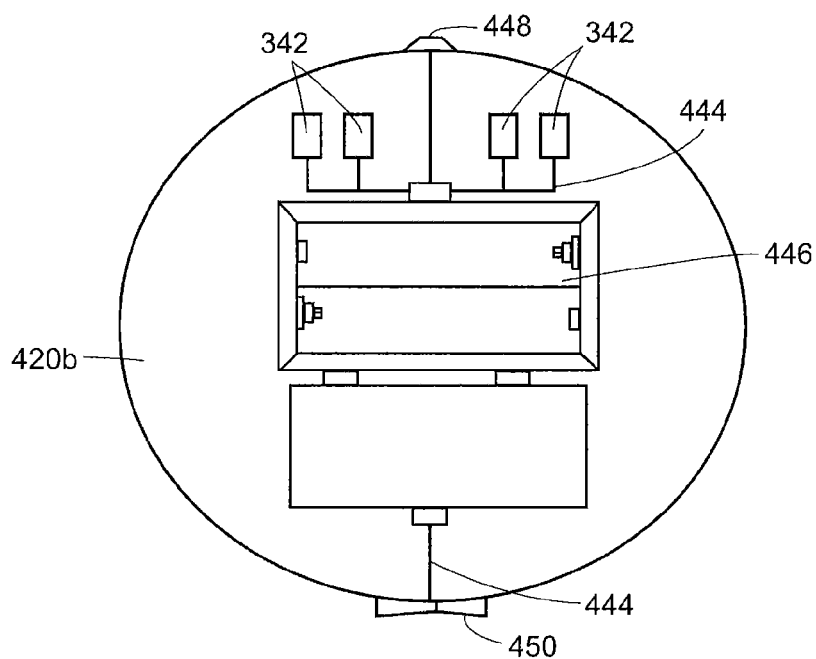
FIG. 13 is a bottom detail view of one component of the cable positioning device of FIGS. 10-12.

FIGS. 10-13 depict yet another embodiment of a cable positioning device 400 constructed in accordance with the present disclosure. The cable positioning device 400 includes upper and lower housing components 420a, 420b. Similar to the cable positioning devices 10, 100, 200 described above with reference to FIGS. 1-5, the device 400 is generally cylindrical, or puck-shaped. Also, similar to the cable positioning device 300 described above with reference to FIGS. 6-9, the device 400 is equipped with one or more light sources 442 disposed within the lower housing component 420*b*, as depicted in FIG. 13. Accordingly, the lower housing component 420*b* also includes circuitry 444, a power source 446, a sensor 448, a switch 450, and a plurality of openings 452. The circuitry 444, power source 446, sensor 448, switch 450, and openings 452 can include components that are identical to the corresponding components of the device 300 described above with reference to FIGS. 6-9, and therefore, the details will be not be repeated. In an alternative embodiment, the upper and/or lower housing components 420*a*, 420*b* of the device 400 in FIGS. 10-13 can be constructed of a transparent or translucent material, for example, such that the openings 452 are not required to emit light therefrom.

Figure 10:
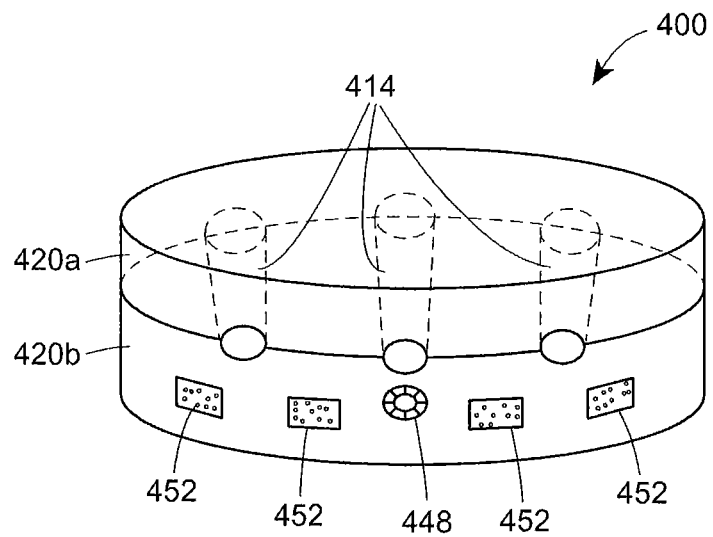
FIG. 10 is a front perspective view of a fifth embodiment of a cable positioning device constructed in accordance with the present disclosure.
Figure 11:
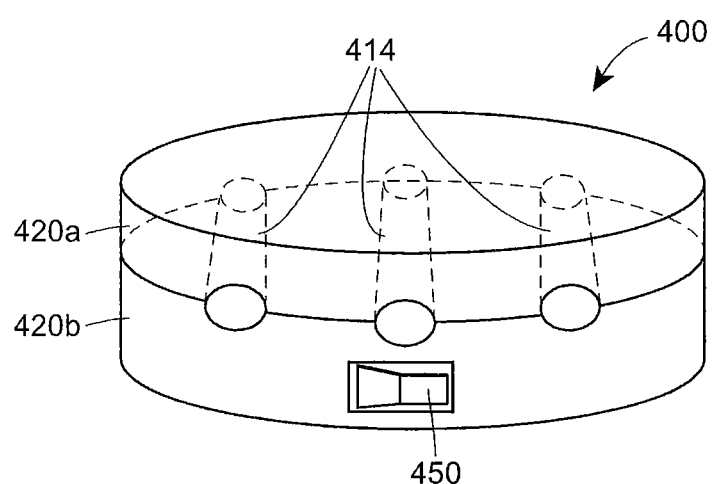
FIG. 11 is a rear perspective view of the cable positioning device of FIG. 10.
Figure 12:
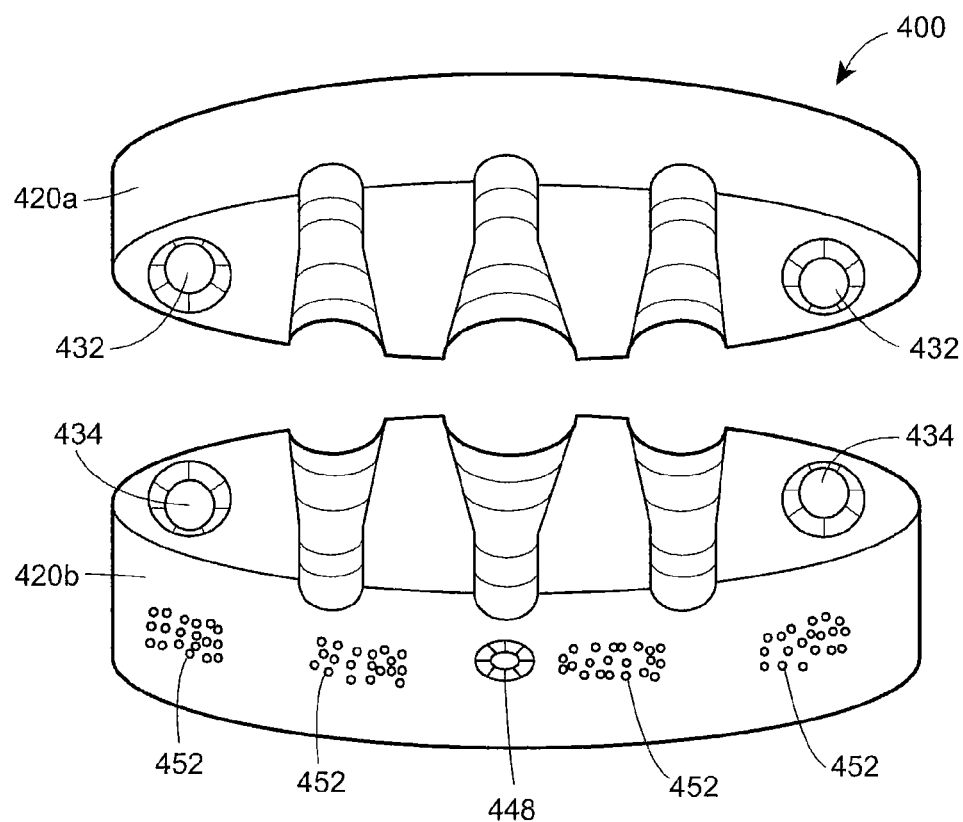
FIG. 12 is a partially exploded front perspective view of the cable positioning device of FIGS. 10 and 11.

In contrast the devices described in the foregoing embodiments, the device 400 depicted in FIGS. 10-13 includes three (3) channels 414 when the upper and lower housing components 420*a*, 420*b* are engaged with one another, as shown in FIGS. 10 and 11. Each of the three channels 414 are substantially identical to the channels 14, 114, 214, 314 described above with respect to prior embodiments and therefore the details and function thereof will not be repeated. The advantage of having three channels 414 is that three cables can be accommodated in a single device 400. Moreover, although each of the channels 414 are depicted as having substantially the same dimensions, the device 400 could be designed such that different channels 414 could have different dimensions for accommodating cables of different dimensions, e.g., thicknesses.

Figure 14:
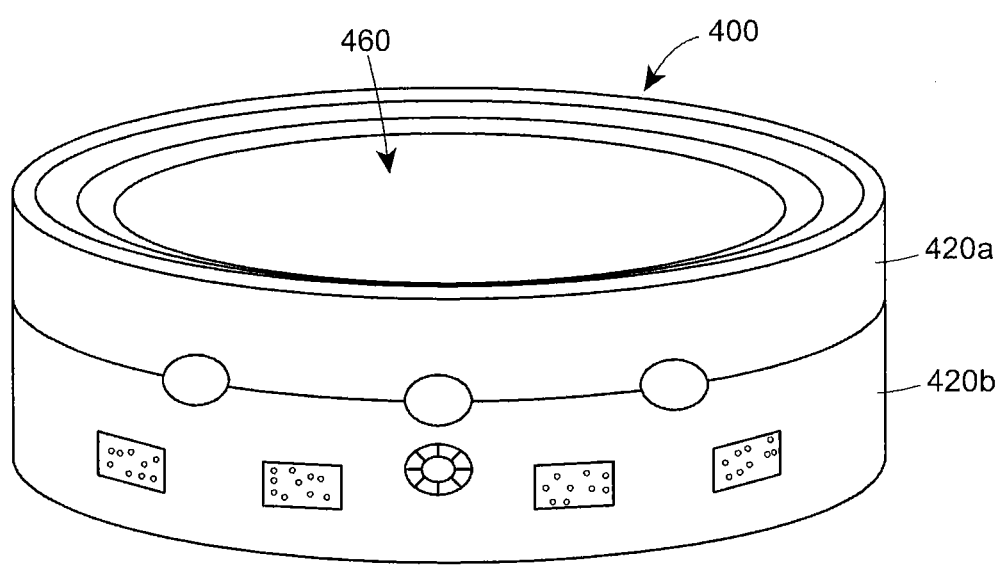
FIG. 14 is a front perspective view of a sixth embodiment of a cable positioning device constructed in accordance with the present disclosure.

Finally, similar to the devices 10, 100, 200, 300 described hereinabove, the device 400 depicted in FIGS. 10-13 could be equipped with protrusions 432 and recesses 434 (shown in FIG. 12), magnets such as the magnets discussed with respect to FIG. 3, a ridge and a recess such as the ridge and recess discussed with respect to FIGS. 8 and 9, a hinge such as the hinge discussed with respect to FIG. 5, or any combination thereof for aligning the upper and lower housing components 420*a*, 420*b* and simplifying the assembly process for the user. In another embodiment, the device 400 or any other device within the scope of the present disclosure can be equipped with a recess 460 (shown in FIG. 14) formed in a top surface of the upper housing component, for example. The recess 460 can advantageously be used to collect personal effects such as change, keys, cuff-links, etc. and can alternatively be used in combination with magnets disposed in the upper housing component to safely secure the personal effects therein. In FIG. 14, the recess 460 is generally a curved contoured surface, which may be referred to as a concave surface, for example. While only the device 400 depicted in FIGS. 10-13 is expressly disclosed as including more than one channel, it should be appreciated that any of the foregoing devices 10, 100, 200, 300 could also have more than one channel. Furthermore, the device 400 could have less than three channels 414, and even a single channel 414. Thus, it should be appreciated that the present disclosure not only includes the specific embodiments described herein, but also alternative embodiments constructed to include features selected and compiled from each of the disclosed embodiments.

While the light sources, sensors, power sources, and related components of the various embodiments described herein have been expressly described as being located in the lower housing components of the devices, some or all of these components could be located in the upper housing components in alternative embodiments.

While the foregoing description sets forth various embodiments of a device for positioning a cable, the present invention is not intended to limited to any of the specific structures described herein. Rather, the invention is intended to be defined by the spirit and scope of the appending claims, and all equivalents thereof.

What is claimed:

1. A device for releasably positioning a cable on a support surface, the device comprising:
   a first housing component releasably engaged with a second housing component;
   at least one channel defined between the first and second housing components for releasably receiving and positioning a cable; and
   a coupling device disposed in at least one of the first and second housing components for releasably coupling the first and second housing components, wherein the coupling device comprises a magnet disposed in the first housing component and a metal component disposed in the second housing component such that the metal component is attracted to the magnet.

2. The device of claim 1, wherein the at least one channel has an inlet and an outlet having the same dimensions.

3. The device of claim 1, further comprising a protrusion formed on the first housing component and a recess formed in the second housing component, the recess releasably receiving the protrusion to align the first and second housing components relative to each other.

4. The device of claim 1, wherein the at least one channel comprises a plurality of channels, each of the plurality of channels adapted to releasably receive and position a cable.

5. The device of claim 1, further comprising a light source disposed in at least one of the first and second housing components for illuminating at least a portion of the device.

6. The device of claim 5, further comprising a sensor attached to one of the first and second housing components, the sensor in communication with the light source for selectively activating the light source.

7. A device for releasably positioning a cable on a support surface, the device comprising:
   a first housing component releasably engaged with a second housing component;
   at least one channel defined between the first and second housing components for releasably receiving and positioning a cable, wherein the at least one channel comprises a plurality of channels, each of the plurality of channels adapted to releasably receive and position a cable; and
   a coupling device disposed in at least one of the first and second housing components for releasably coupling the first and second housing components, wherein the coupling device comprises a magnet disposed in the first housing component and a metal component disposed in the second housing component such that the metal component is attracted to the magnet.

8. The device of claim 7, wherein at least one of the plurality of channels has an inlet and an outlet having the same dimensions.

9. The device of claim 7, further comprising a protrusion formed on the first housing component and a recess formed in the second housing component, the recess releasably receiving the protrusion to align the first and second housing components relative to each other.

10. The device of claim 7, further comprising a light source disposed in at least one of the first and second housing components for illuminating at least a portion of the device.

11. The device of claim 10, further comprising a sensor attached to one of the first and second housing components, the sensor in communication with the light source for selectively activating the light source.

12. A device for releasably positioning a cable on a support surface, the device comprising:
- a first housing component releasably engaged with a second housing component;
- at least one channel defined between the first and second housing components for releasably receiving and positioning a cable; and
- a light source disposed in at least one of the first and second housing components for illuminating at least a portion of the device.

13. The device of claim 12, wherein the at least one channel has an inlet and an outlet having the same dimensions.

14. The device of claim 12, further comprising a coupling device disposed in at least one of the first and second housing components for releasably coupling the first and second housing components.

15. The device of claim 14, wherein the coupling device comprises a magnet disposed in the first housing component and a metal component disposed in the second housing component such that the metal component is attracted to the magnet.

16. The device of claim 12, further comprising a protrusion formed on the first housing component and a recess formed in the second housing component, the recess releasably receiving the protrusion to align the first and second housing components relative to each other.

17. The device of claim 12, wherein the at least one channel comprises a plurality of channels, each of the plurality of channels adapted to releasably receive and position a cable.

18. The device of claim 12, further comprising a sensor attached to one of the first and second housing components, the sensor in communication with the light source for selectively activating the light source.

\* \* \* \* \*